3,079,422
PRODUCTION OF AROMATIC NITRILES BY CATALYTIC AIR OXIDATION

Joseph Z. Pasky, Berkeley, Calif., assignor to California Research Corporation, San Francisco, Calif., a corporation of Delaware
No Drawing. Filed June 3, 1958, Ser. No. 739,459
1 Claim. (Cl. 260—465)

This invention relates to the production of aromatic nitriles by catalytic air oxidation and, more particularly, to the reaction of aromatic hydrocarbons with air and ammonia to produce aromatic nitriles in the vapor phase in the presence of a catalyst.

Aromatic nitriles have a great variety of uses as intermediates in the preparation of aromatic acids, amines, and the like which are used in the manufacture of synthetic resins and fibers. The processes proposed heretofore for producing aromatic nitriles have had various commercial disadvantages, namely, use of expensive or toxic reagents and impracticably low space rates and yields.

It has now been found that aromatic nitriles can be produced by the vapor phase reaction of an aromatic hydrocarbon, ammonia, and air in the presence of a catalyst having two components. Aside from the usual supports, the catalyst includes a component capable of effecting oxidation of the hydrocarbon and a component capable of effecting oxidation of ammonia. Although the mechanism of the reaction is not completely understood, it is apparent that the two components of the catalyst effect simultaneous oxidation of the hydrocarbon and the ammonia and that oxidation intermediates of these two compounds combine to produce the aromatic nitrile.

The hydrocarbon oxidation catalysts are generally composed of the class of variable-valent heavy metals and their oxides which are capable of functioning in an oxidation-reduction cycle in the presence of molecular oxygen at elevated temperatures and which promote the partial oxidation of hydrocarbons. Typical among such catalysts are the oxides of vanadium, molybdenum, columbium, chromium, tungsten, uranium, manganese, copper, iron, cobalt and nickel. Vanadium pentoxide has yielded satisfactory results.

Of the numerous catalysts which are classified as ammonia oxidizing catalysts, it has been found that the more active catalysts should be used in the present process. These very active ammonia oxidizing catalysts are generally the noble metals and noble metal oxides and, particularly, it has been found that platinum, when combined with the hydrocarbon oxidizing catalyst, produces the most desirable catalyst.

It is quite apparent that the two catalyst components form a synergistic combination when utilized together as a catalyst in this process. When vanadium pentoxide is used as a catalyst alone under the conditions of the process disclosed hereinafter, either the yield of nitrile or space velocity of the reactants is impracticably low. Likewise, when platinum was used in substantial amounts to catalyze this reaction, the temperature increased very rapidly in localized areas of the catalyst bed, making control of the reaction very difficult. However, when vanadium pentoxide and platinum are used together in the proper proportion as the catalyst, the space velocity of the reactants in the catalyst bed can be increased and the yields of aromatic nitriles are increased.

The reaction is operable over a wide range of catalyst concentrations and concentrations of the individual components of the catalyst. The hydrocarbon oxidizing component of the catalyst may be deposited on a suitable support or may form the base of the catalyst on which the ammonia oxidizing component is deposited. The hydrocarbon oxidizing component should form at least 1% of the total weight of the catalyst. The amount of this component present is not critical. The ammonia oxidizing component should be used in an amount that it forms at least 0.01% of the weight of the catalyst introduced into the reactor, and preferably from 0.01 to 1.0 weight percent. However, as other conditions of operation are changed, the quantity of ammonia oxidizing component of the catalyst can be changed over wide limits.

Percentage compositions of the catalyst are designated as the composition of the catalyst before it is placed in the reaction tube. The composition of individual particles of the catalyst may change during preheating of the catalyst or during the reaction.

Although the catalyst can be used in very small quantities, it has been found desirable to employ a sufficient quantity relative to the amount of liquid hydrocarbon in the feed stream that the space velocity of the liquid hydrocarbon will be between 0.02 and 1.0, and preferably between 0.02 and 0.30, volume of liquid hydrocarbon per volume of supported catalyst per hour. Quantities of catalyst less than this amount are operable; however, when the space rate exceeds about one volume of liquid hydrocarbon per volume of catalyst per hour, conversion of the hydrocarbon decreases and the quantity of heat generated in the catalyst bed makes control of the reaction difficult. The lower limit of space rate is not dictated by operability of the process but merely by practicality.

The process should be carried out within the temperature range of about 300° to 650° C., and preferably within the range of 370° to 500° C. Within these temperature ranges, it is desirable to correlate temperature with space velocity. Generally, as the temperature is increased, a proportionate increase in space velocity should be effected for optimum yields. For the particular catalyst, 12% $V_2O_5$ on SiC with 0.13% platinum thereon, the temperature is preferably maintained within the range of 385° to 500° C. The lower limit is relatively critical, but is dependent upon the particular catalyst used. Even for the class of platinum-vanadium pentoxide catalysts, the lower temperature limit will vary over a wide range as the quantity of platinum in the catalyst is changed.

It has been found most desirable to use between 3 and 10 molar equivalents of ammonia in the feed stream, based on the quantity of hydrocarbon present in the stream. The most satisfactory results are obtained with a mole ratio of ammonia to hydrocarbon of about 6. The process is equally operable with equally high conversions and yields when much more ammonia is used; however, much of the additional ammonia is merely burned and lost, and the burning of the excess ammonia in the catalyst bed results in increases in temperature which are difficult to control.

It has been found that air should be employed in the feed stream in the amount of at least 10 molar equivalents, based on hydrocarbon feed, in order for the process to operate efficiently. Lower amounts of air cause very rapid reduction in the conversion of the hydrocarbon. Indeed, it has been found most desirable to use between 50 and 150 moles of air per mole of liquid hydrocarbon. The nitrogen in the air and the oxygen in excess of that required for the reaction serve a very valuable function in that they cool the catalyst bed, reducing hot spots and making control of the reaction much easier.

A great variety of hydrocarbon feeds may be used in the process; most desirably, any mono- or poly-nuclear aromatic hydrocarbon having from 7 to 15 carbon atoms per molecule which is readily subject to oxidation. It is contemplated that the process of the present invention may be of great utility in forming benzonitriles from toluene; however, in view of the fact that the phthalonitriles have much more utility in the field of resins and fibers than do mononitriles, the process of the invention has been particularly designed for the selective production of the dinitrile. Accordingly, the preferred hydrocarbon feeds for the process comprise the mono- and poly-nuclear aromatic hydrocarbons having 8 to 10 carbon atoms per molecule and which contain two carbon atoms separately bonded to a benzene nucleus.

The invention, having been described in detail above, is further illustrated by the following examples. The catalyst comprised 12% vanadium pentoxide on silicon carbide with platinum deposited thereon. The platinum was deposited in the form of the chloride by evaporation of a solution of chloroplatinic acid in which the vanadium pentoxide-silicon carbide catalyst was placed. The combined catalyst was then heated in an oxidizing gas prior to contact with the hydrocarbon. The hydrocarbon feed was, in each case, a xylene isomer.

The examples were carried out by passing the hydrocarbon, ammonia, and air through a catalyst-packed, vertical, stainless-steel tube (94 x 1.27 cm.). The tube was heated by an external mercury bath. The tube was packed with 130 cc. of catalyst, which occupied about 68 linear centimeters in the tube. The upper portion of the catalyst tube was packed with glass helices to serve as a preheater and a gas-mixing space. A 5 millimeter outside diameter tube made of stainless steel was provided coaxially of the reaction tube to serve as a thermowell. The reactions were carried out at atmospheric pressure. After passing through the catalyst bed, the gas was passed into an ice-cooled receiver and then through a glass cloth filter, followed by a Dry-Ice condenser. The solid material in the ice-cooled receiver and on the glass filter cloth was scraped into a Buchner funnel and filtered free of liquid with suction. The filter cake was washed with cold water. Other organic materials were recovered by an ether wash of the glass filter cloth, filtrate and material obtained from the Dry-Ice condenser. The resulting solution was fractionally distilled.

*Example 1*

In accordance with the above procedure, a mixture comprising 1 mole of metaxylene, 3.46 moles of ammonia, and 69.5 moles of air was passed through a catalyst on which 0.13 weight percent platinum was initially deposited; the catalyst was roasted in a stream of air at 500° C. before the hydrocarbon and ammonia were introduced into the reaction tube. The catalyst bed was maintained at a temperature of 440° C., and the space velocity of the reactants was 1630 volumes of reaction gas per hour per volume of apparent volume of catalyst (space velocity of liquid hydrocarbon=0.113 volume of liquid hydrocarbon per hour per apparent volume of catalyst). The yield of aromatic nitriles was 4% metatolunitrile and 51.5% isophthalonitrile at a hydrocarbon conversion of 90% to 95%.

*Example 2*

The procedure of Example 1 was repeated, using the same catalyst, 1 mole of metaxylene, 6.65 moles of ammonia, 134 moles of air, and a temperature of 435° C. The total space velocity of reactants was again 1630 v./hr./v. (liquid hydrocarbon space velocity=0.057 v./hr./v.). A yield of 65.5% isophthalonitrile as obtained at a conversion of 95% to 100%.

This example indicates that higher mole ratios of ammonia and air to xylene are preferred.

*Example 3*

The procedure of Example 2 was repeated, using the same conditions with orthoxylene as the hydrocarbon feed. A yield of 6% phthalonitrile and 54% phthalimide was obtained at 95% to 100% conversion.

*Example 4*

The procedure of Example 2 was again repeated, using the same conditions with paraxylene as the hydrocarbon feed. A yield of 69% to 73% terephthalonitrile was obtained at a conversion of 95% to 100%.

*Example 5*

The procedure of Example 2 was repeated with metaxylene and substantially the same conditions, except that the space velocity of the reactants was doubled and the temperature was maintained at 438° C. The xylene conversion was again 95% to 100%, but the yield fell to 41% isophthalonitrile and 11% metatolunitrile.

*Example 6*

The above procedure was again repeated using 1 mole of metaxylene, 9.4 moles of ammonia, and 137 moles of air. The total gas space velocity was 3720 v./hr./v. (liquid xylene space velocity=0.129 v./hr./v.), and the temperature was maintained at 479° C. The yield of isophthalonitrile was 64.5% at a conversion of 95% to 100%.

Examples 5 and 6 illustrate that, for a given catalyst composition and feed stream formulation, higher temperatures must be used as the space velocity of the reactants is increased.

*Example 7*

The procedure of Example 2 was repeated, using substantially the same feed and conditions except that the temperature was maintained at 382° C. with the result that the conversion dropped to 74% and the yield was 17% tolunitrile and 8.5% isophthalonitrile.

*Example 8*

Example 7 was repeated at a temperature of 510° C. to 543° C., with a resulting 100% conversion and 15% yield of isophthalonitrile.

Examples 7 and 8 indicate that, for a given catalyst and set of reaction conditions, the temperature of the reaction is fairly critical.

*Example 9*

The procedure of Example 1 was repeated, using a catalyst consisting of 12% vanadium pentoxide on silicon carbide with no platinum thereon. In the absence of the platinum component of the catalyst, the conversion fell to 85% and the yield was 20% metatolunitrile and 25% isophthalonitrile.

Obviously, many modifications and variations of the invention as hereinbefore set forth may be made without departing from the spirit and scope thereof, and therefore only such limitations should be imposed as are indicated in the appended claims.

I claim:

The process for producing phthalodinitriles which comprises contacting a xylene with from 3 to 10 mols of ammonia per mol of xylene and 50 to 150 mols of air per mol of xylene in the vapor phase at a temperature in the range of 370° to 500° C. in the presence of a catalyst composition, the active components of which consist essentially of at least 1 percent of a material containing a variable valent heavy metal selected from the group consisting of vanadium, molybdenum, columbium, chromium, tungsten, uranium, manganese, copper, iron, cobalt, nickel, and oxides thereof, and from about 0.01 to about 1.0 weight percent of platinum at a space velocity of from 0.02 to 0.30 volume of liquid xylene per volume of catalyst per hour, higher space velocities being coupled with higher temperatures.

References Cited in the file of this patent

UNITED STATES PATENTS

| | | |
|---|---|---|
| 2,736,739 | England et al. | Feb. 28, 1956 |
| 2,833,807 | Farkas et al. | May 6, 1958 |

OTHER REFERENCES

Mahan et al.: Abstract of application Serial Number 120,606 published June 5, 1951, 647 O.G. 311.

Clark et al.: The Encyclopedia of Chemistry, 1957, page 12.